United States Patent
Yushiya

(10) Patent No.: US 11,622,101 B2
(45) Date of Patent: Apr. 4, 2023

(54) TRANSMISSION PROCESSING APPARATUS, TRANSMISSION PROCESSING METHOD, AND STORAGE MEDIUM

(71) Applicant: CANON KABUSHIKI KAISHA, Tokyo (JP)

(72) Inventor: Akihiko Yushiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/336,084

(22) Filed: Jun. 1, 2021

(65) Prior Publication Data
US 2021/0385429 A1 Dec. 9, 2021

(30) Foreign Application Priority Data
Jun. 3, 2020 (JP) .............................. JP2020-096834

(51) Int. Cl.
*H04N 13/282* (2018.01)
*H04N 13/178* (2018.01)
*H04N 13/194* (2018.01)
*H04N 13/279* (2018.01)

(52) U.S. Cl.
CPC ......... *H04N 13/282* (2018.05); *H04N 13/178* (2018.05); *H04N 13/194* (2018.05); *H04N 13/279* (2018.05)

(58) Field of Classification Search
None
See application file for complete search history.

(56) References Cited

U.S. PATENT DOCUMENTS

| | | | |
|---|---|---|---|
| 10,623,715 B2* | 4/2020 | Adachi | H04N 13/161 |
| 2005/0204210 A1* | 9/2005 | Lobo | H04N 19/44 |
| | | | 714/701 |
| 2010/0238264 A1* | 9/2010 | Liu | H04N 13/111 |
| | | | 348/E7.077 |
| 2010/0265284 A1* | 10/2010 | Satou | H04N 13/324 |
| | | | 345/697 |
| 2018/0332218 A1* | 11/2018 | Yoshimura | H04N 5/247 |
| 2018/0376131 A1* | 12/2018 | Handa | G06T 15/005 |
| 2019/0356906 A1* | 11/2019 | Handa | G06T 15/205 |
| 2020/0336719 A1* | 10/2020 | Morisawa | G06T 15/205 |

FOREIGN PATENT DOCUMENTS

JP    2019008429 A    1/2019

* cited by examiner

*Primary Examiner* — Talha M Nawaz
(74) *Attorney, Agent, or Firm* — Canon U.S.A., Inc. IP Division

(57) ABSTRACT

A transmission processing apparatus includes a generation unit configured to generate data to be transmitted, based on an image captured by an imaging apparatus, a transmission and reception processing unit configured to receive data transmitted from a second transmission processing apparatus which is in cascade connection to the transmission processing apparatus and to transmit the received data, and a determination unit configured to determine, depending on a type of the data transmitted from the second transmission processing apparatus, whether to transmit the data generated by the generation unit in an order corresponding to the cascade connection or transmit the data generated by the generation unit in parallel with the data transmitted from the second transmission processing apparatus.

10 Claims, 9 Drawing Sheets

FIG.4

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Version | | | | Header Length | | | | Type of Service | | | | | | | | Total Length | | | | | | | | | | | | | | | |
| Identifier | | | | | | | | | | | | | | | | Flags | | | Fragment Offset | | | | | | | | | | | | |
| Time to Live | | | | | | | | Protocol | | | | | | | | Header Checksum | | | | | | | | | | | | | | | |
| Source IP Address | | | | | | | | | | | | | | | | | | | | | | | | | | | | | | | |
| Destination IP Address | | | | | | | | | | | | | | | | | | | | | | | | | | | | | | | |
| Options | | | | | | | | | | | | | | | | | | | | | | | | | | | | Padding | | | |

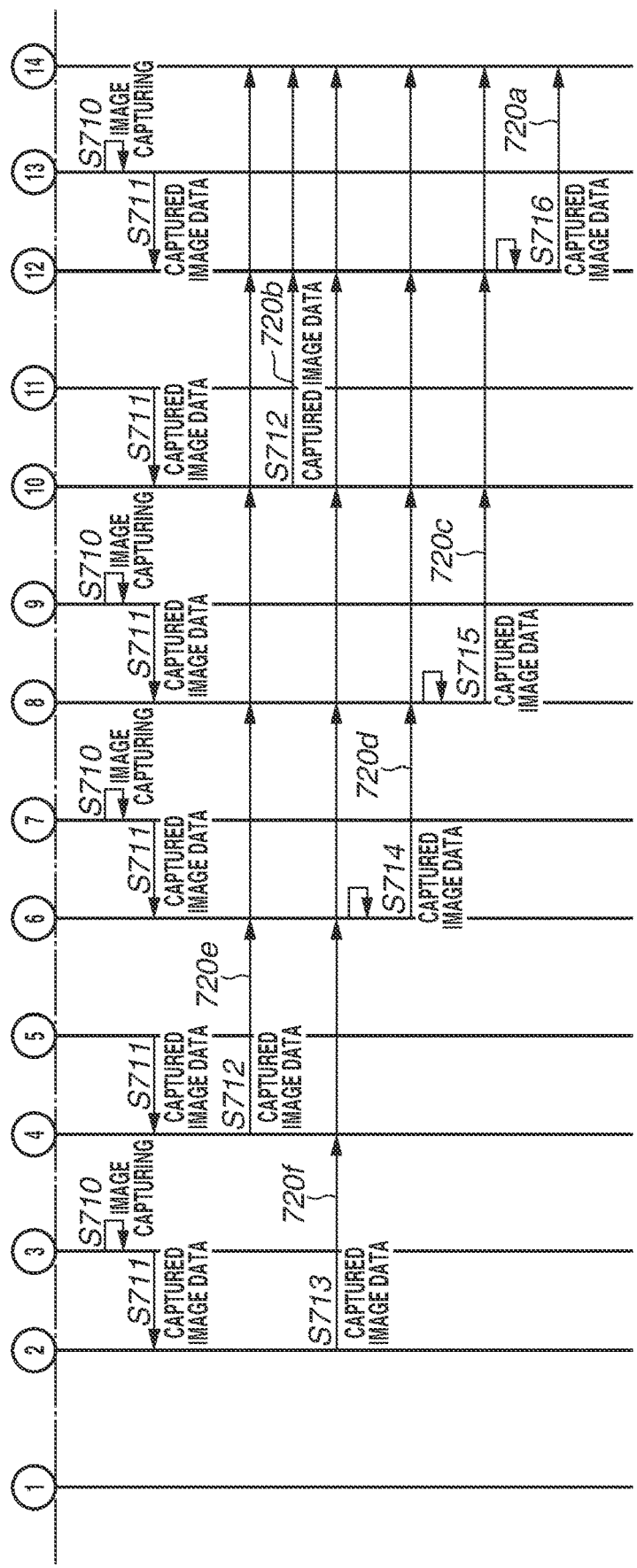

TRANSMISSION PROCESSING APPARATUS, TRANSMISSION PROCESSING METHOD, AND STORAGE MEDIUM

BACKGROUND

Field

Aspects of the present disclosure generally relate to a technique of performing transmission processing on images captured by a plurality of imaging apparatuses.

Description of the Related Art

Recently, a technique of placing a plurality of imaging apparatuses at respective different positions, performing synchronous image capturing with a plurality of viewpoints, and generating a virtual viewpoint image using a plurality of images obtained by the synchronous image capturing has been attracting attention. Such a technique of generating a virtual viewpoint image from a plurality of images enables viewing, for example, a highlight of the game of soccer or basketball from various angles, and is, therefore, able to give the user high realistic feeling as compared with an ordinarily captured image.

Moreover, generation and viewing of a virtual viewpoint image that is based on images captured with a plurality of viewpoints can be implemented by consolidating images captured by a plurality of imaging apparatuses into an information processing apparatus such as a server and causing the information processing apparatus to perform processing, such as three-dimensional model generation or rendering, on the captured images and transmit the generated virtual viewpoint image to a user terminal. Then, to generate a high-quality virtual viewpoint image, it is necessary to allocate a bandwidth sufficient to transmit a plurality of images from the plurality of imaging apparatuses to the information processing apparatus.

On the other hand, Japanese Patent Application Laid-Open No. 2019-8429 discusses a technique of allowing a reduction in bandwidth by separating an image captured by a camera into a foreground image, in which there are many dynamic changes of, for example, players or balls, and a background image, in which there are few dynamic changes of, for example, goalposts or a field, and transmitting the foreground image and the background image at the respective different frame frequencies. Thus, Japanese Patent Application Laid-Open No. 2019-8429 discusses a technique of reducing a bandwidth required for transmission by outputting the foreground image at a high frame frequency and outputting the background image at a low frame frequency to reduce the amount of data to be transmitted.

However, dynamic changes of the foreground image may cause a variance in bandwidth required for transmission for each scene, and, in this case, the above-mentioned related art creates difficulty in efficiently transmitting image data captured by a plurality of imaging apparatuses.

Accordingly, there is a need for efficiently transmitting image data captured by a plurality of imaging apparatuses.

SUMMARY

According to an aspect of the present disclosure, a transmission processing apparatus includes a generation unit configured to generate data to be transmitted, based on an image captured by an imaging apparatus, a transmission and reception processing unit configured to receive data transmitted from a second transmission processing apparatus which is in cascade connection to the transmission processing apparatus and to transmit the received data, and a determination unit configured to determine, depending on a type of the data transmitted from the second transmission processing apparatus, whether to transmit the data generated by the generation unit in an order corresponding to the cascade connection or transmit the data generated by the generation unit in parallel with the data transmitted from the second transmission processing apparatus.

Further features of the present disclosure will become apparent from the following description of exemplary embodiments with reference to the attached drawings.

BRIEF DESCRIPTION OF THE DRAWINGS

FIG. 4 is a diagram illustrating a header format of the Internet Protocol.

FIGS. 7A and 7B are operation sequence diagrams of an image acquisition apparatus according to one or more aspects of the present disclosure.

DESCRIPTION OF THE EMBODIMENTS

Figure 1:
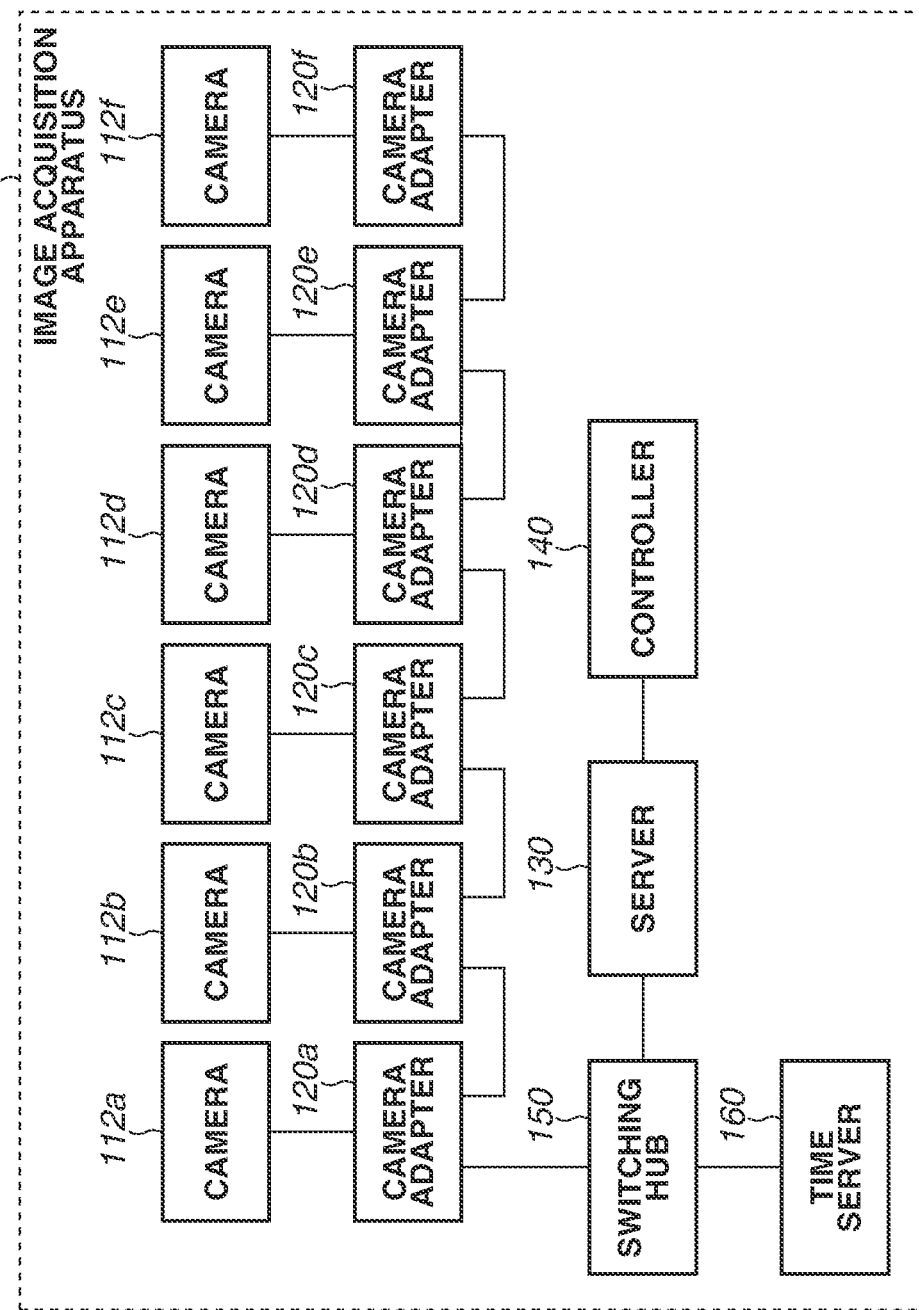
FIG. 1 is a diagram illustrating an example of an outline configuration of an image acquisition apparatus according to one or more aspects of the present disclosure.

Various exemplary embodiments, features, and aspects of the present disclosure will be described in detail below with reference to the drawings. Furthermore, configurations described in the following exemplary embodiments are merely examples, and the present disclosure is in no way limited to the described configurations. Furthermore, the respective same constituent elements or processing operations are assigned the respective same reference characters for the purpose of description.

A first exemplary embodiment is directed to, for example, a system which includes a plurality of imaging apparatuses (hereinafter referred to as "cameras") arranged in a facility such as a sports arena (stadium) or a concert hall and performs image capturing with the plurality of cameras.

FIG. 1 is a diagram illustrating a configuration example of an image acquisition apparatus 100 serving as an image acquisition system according to the first exemplary embodiment.

The image acquisition apparatus 100 is configured to include cameras 112a to 112f, camera adapters 120a to 120f, a switching hub 150, an image computing server (hereinafter referred to as a "server") 130, a time server 160, and a controller 140. The camera adapters 120a to 120f are cascade-connected to each other in such a way as to form a daisy chain. Moreover, each of the camera adapters 120a to 120f is connected to a corresponding one of the cameras 112a to 112f. The server 130, the time server 160, and the camera adapter 120a are connected to the switching hub 150, and the controller 140 is connected to the switching hub 150 via the server 130.

Furthermore, in the first exemplary embodiment, unless specifically stated otherwise, each of the cameras 112a to 112f is referred to as a "camera 112" without any distinction. Similarly, unless specifically stated otherwise, each of the camera adapters 120a to 120f is referred to as a "camera adapter 120" without any distinction. Moreover, in the first exemplary embodiment, a camera 112 connected in association with one camera adapter 120 is specifically referred to as an "associated camera 112". Moreover, in the first exemplary embodiment, out of the cascade-connected camera adapters 120, each camera adapter 120 situated on a side farther from the server 130 (i.e., the server 130 via the switching hub 150 on the network) with respect to a camera adapter 120 of interest is referred to as an "upstream camera adapter". On the other hand, each camera adapter 120 situated on a side nearer to the server 130 (i.e., the server 130 via the switching hub 150 on the network) with respect to a camera adapter 120 of interest is referred to as a "downstream camera adapter". Additionally, in the first exemplary embodiment, unless specifically stated otherwise, the term "image" is assumed to include concepts of a moving image and a still image for the purpose of description. Thus, the camera 112 in the first exemplary embodiment is able to acquire both a still image and a moving image, the camera adapter 120 is able to process and transmit both a still image and a moving image, and the server 130 is able to consolidate and process both still images and moving images.

The camera adapter 120 performs control, synchronization signal provision, and clock time setting with respect to the associated camera 112, and performs transmission and reception processing on a packet generated from image data captured by the associated camera 112 or packets transmitted from cascade-connected other camera adapters 112. Control of the associated camera 112 to be performed by the camera adapter 120 includes, for example, setting and reference of image capturing parameters, acquisition of the status of the associated camera 112, starting and stopping of image capturing, and focus adjustment. Examples of the image capturing parameters of the camera 112 include the number of pixels, color depth, frame rate, and white balance. Examples of the status of the camera 112 include image capturing in progress, stopping in progress, synchronizing in progress, and error occurrence. The synchronization signal provision is performed by the camera adapter 120 providing image capturing timing (control clock signal) to the camera 112 with use of clock time synchronized with the time server 160. The clock time setting is performed by the camera adapter 120 providing, to the associated camera 112, clock time synchronized with the time server 160 using a timecode compliant with, for example, the format of Society of Motion Picture and Television Engineers (SMPTE) 12M. With this clock time setting, the provided timecode is appended to captured image data which the camera adapter 120 receives from the associated camera 112. Furthermore, the format of the timecode is not limited to the SMPTE 12M, but can be another format.

The controller 140 controls image capturing operations of the cameras 112a to 112f by sending control signals to the camera adapters 120a to 120f via the network of the image acquisition apparatus 100. The controller 140 causes the server 130 to consolidate pieces of image data captured by the cameras 112a to 112f and received via the camera adapters 120a to 120f, and performs, for example, processing for extracting desired image data from the server 130.

Figure 2:
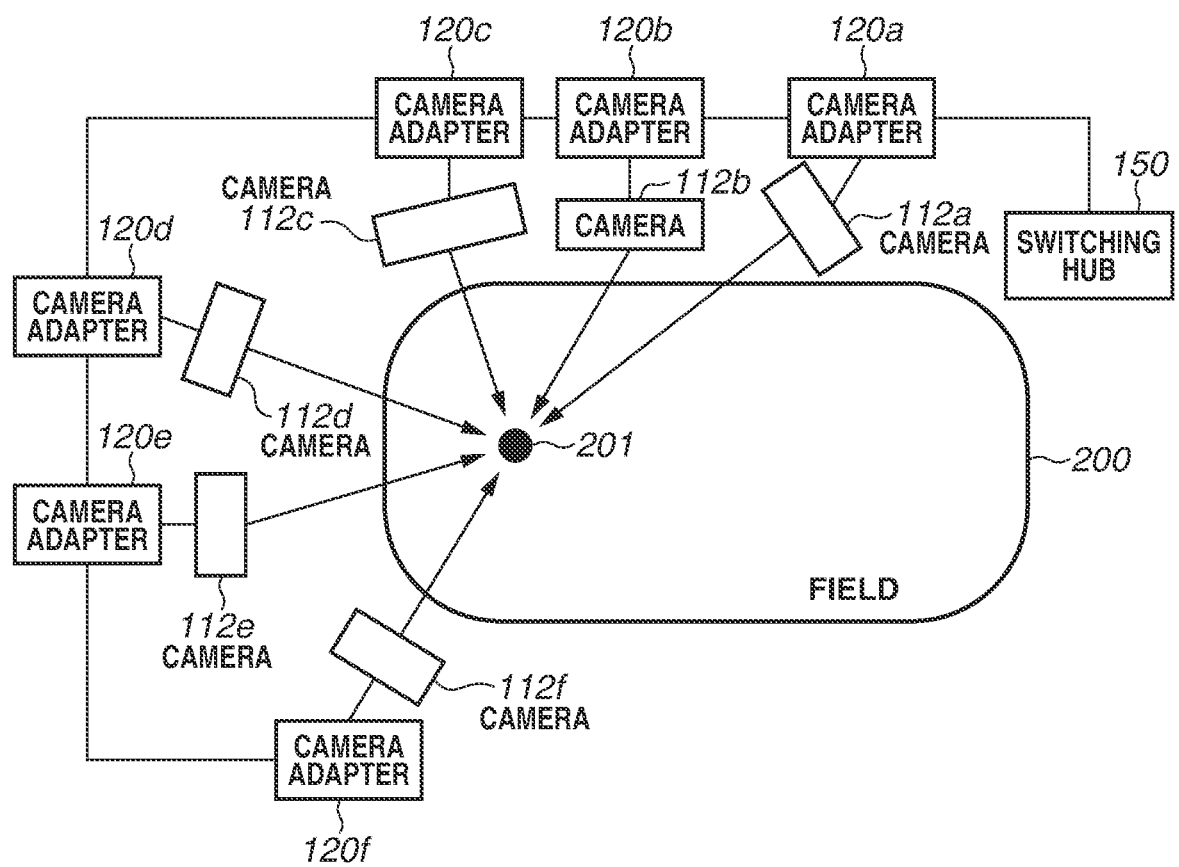
FIG. 2 is a diagram used to explain a relationship between the arrangement of cameras and camera adapters and a subject.

FIG. 2 is a diagram illustrating a subject 201 and an example of the arrangement of the cameras 112a to 112f in the first exemplary embodiment.

As illustrated in FIG. 2, the cameras 112a to 112f and the camera adapters 120a to 120f are arranged in such a way as to surround a field 200 of the sports arena (stadium). Moreover, the cameras 112a to 112f are arranged in such a manner that the respective optical axes thereof are directed to the subject 201. Furthermore, in FIG. 2, the server 130, the controller 140, and the time server 160 illustrated in FIG. 1 are omitted from illustration.

In the image acquisition apparatus 100 according to the first exemplary embodiment, as illustrated in FIG. 2, a plurality of cameras 112 is arranged at the respective different positions in such a way as to surround the field 200, and synchronous image capturing is performed with a plurality of viewpoints by the plurality of cameras 112. Then, plurality-of-viewpoints images captured by the plurality of cameras 112 are transmitted to the server 130, which is an example of an information processing apparatus. The server 130 performs processing for generating, for example, a virtual viewpoint image with use of the received plurality-of-viewpoints images. Thus, the image acquisition apparatus 100 according to the first exemplary embodiment is applicable to, for example, a virtual viewpoint image generation system which generates, for example, a virtual viewpoint image from plurality-of-viewpoints images. Furthermore, the virtual viewpoint image may be called a free viewpoint image.

Moreover, in the image acquisition apparatus 100 according to the first exemplary embodiment, each of the cascade-connected camera adapters 120 converts captured image data obtained by image capturing performed by the associated camera 112 into a packet and transmits the packet. Moreover, in the image acquisition apparatus 100 according to the first exemplary embodiment, a plurality of cascade-connected camera adapters 120 is set to be divided into sequential transmission camera adapters and simultaneous transmission camera adapters. Each sequential transmission camera adapter generates a sequential transmission packet from image data captured by the associated camera and transmits the sequential transmission packet, and each simultaneous transmission camera adapter generates a simultaneous transmission packet from image data captured by the associated camera and transmits the simultaneous transmission packet. The sequential transmission packets are sequentially transmitted by the respective cascade-connected camera adapters 120 one by one in the order of being farther from the server 130 (i.e., the server 130 via the switching hub 150 on the network). On the other hand, the simultaneous transmission packets are transmitted by the simultaneous transmission camera adapters immediately after being generated from image data captured by each associated camera. Moreover, each camera adapter 120 transmits the simultaneous transmission packet in parallel with the sequential transmission packet. Thus, the camera adapter 120 determines, depending on a type of received data (a simultaneous transmission packet or a sequential transmission packet), whether to transmit a packet generated from image data captured by the associated camera 112 in the order of cascade connection or in parallel.

For example, in the case of an application to a virtual viewpoint image generation system, the sequential transmission camera adapter separates a foreground region, in which there are many dynamic changes in, for example, players or balls, from an image captured by the associated camera, and transmits, as a sequential transmission packet, a packet generated from image data about the foreground region. On the other hand, the simultaneous transmission camera adapter separates a background region, in which there are few dynamic changes in, for example, goalposts or a field, from an image captured by the associated camera, and transmits, as a simultaneous transmission packet, a packet generated from image data about the background region. Thus, in the image acquisition apparatus 100 according to the first exemplary embodiment, image data about the foreground region, for which a high frame frequency is required, is transmitted as a sequential transmission packet, and, on the other hand, image data about the background region, for which a relatively low frame frequency is sufficient, is transmitted as a simultaneous transmission packet. In the image acquisition apparatus 100 according to the first exemplary embodiment, making it possible to transmit a sequential transmission packet and a simultaneous transmission packet independently of each other in the above-mentioned way enables highly efficient transmission.

Figure 3:
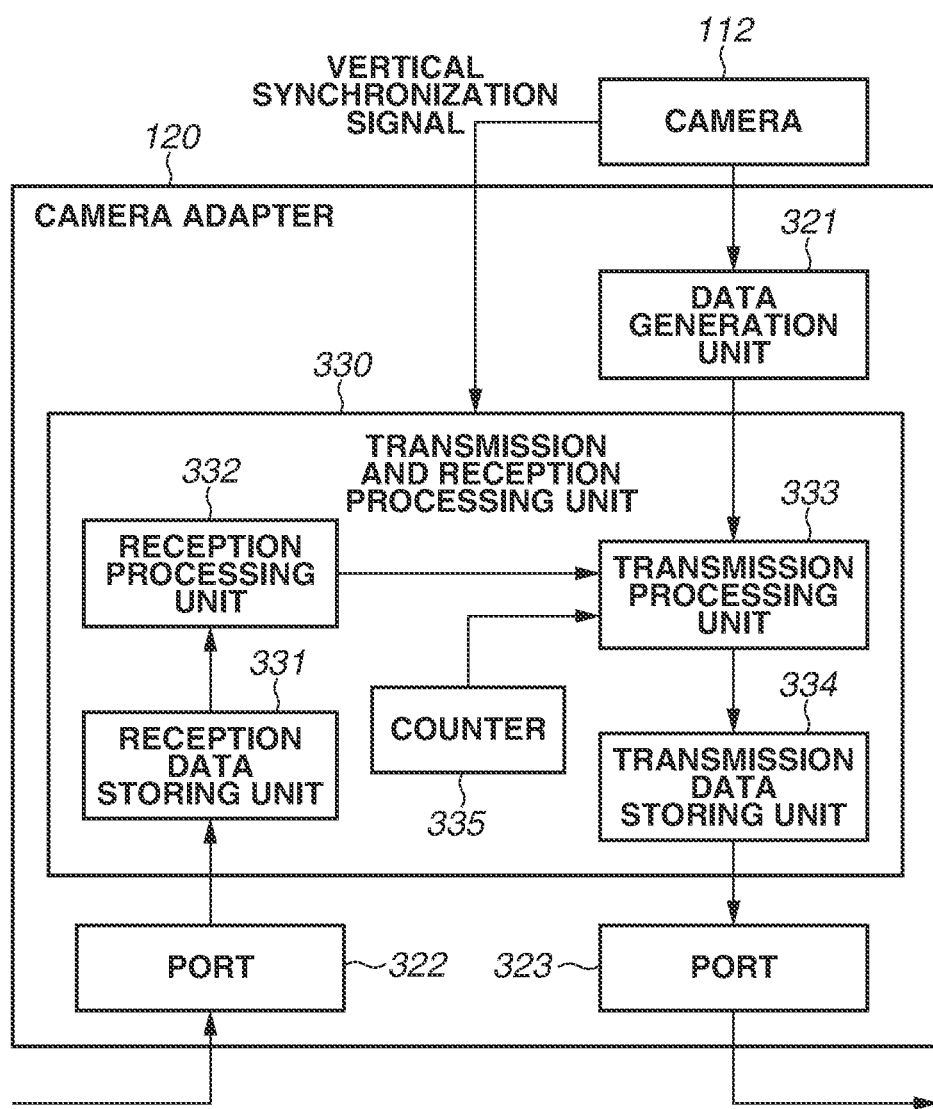
FIG. 3 is a block diagram for use in describing an internal configuration of each camera adapter.

FIG. 3 is a block diagram illustrating an internal configuration example of the camera adapter 120 and a configuration of its neighborhood.

Referring to FIG. 3, the camera adapter 120 is configured to include a data generation unit 321, a transmission and reception processing unit 330, a port 322, and a port 323.

The data generation unit 321 acquires captured image data from the associated camera 112, and performs, for example, coding and addition processing of error-correction codes on the captured image data to generate transmission data. The transmission data generated by the data generation unit 321 is sent to the transmission and reception processing unit 330.

The port 322 is a port connected to an upstream-side constituent element in the cascade connection, and the port 323 is a port connected to a downstream-side constituent element in the cascade connection. For example, the above-mentioned packets and control signals output from the controller 140 are transmitted via the ports 322 and 323.

The transmission and reception processing unit 330 is configured to include a reception data storing unit 331, a reception processing unit 332, a transmission processing unit 333, a transmission data storing unit 334, and a counter 335, and performs processing of packets which the camera adapter 120 transmits and receives. Moreover, the transmission and reception processing unit 330 receives transmission data from the data generation unit 321 and receives a vertical synchronization signal from the associated camera 112.

The reception data storing unit 331 temporarily stores a packet transmitted from an upstream adjacent camera adapter and received by the port 322.

The reception processing unit 332 reads out a packet temporarily stored by the reception data storing unit 331, performs reception processing on the packet based on header information about the packet, and sends the packet subjected to reception processing to the transmission processing unit 333.

The transmission processing unit 333 receives a packet transmitted from an upstream adjacent camera adapter and subjected to reception processing by the reception processing unit 332, and performs processing required for transmitting the packet. Moreover, the transmission processing unit 333 receives transmission data generated by the data generation unit 321 from image data captured by the associated camera 112, generates a packet obtained by fragmenting the transmission data, and append, to the packet, header information compliant with the header format of the Internet Protocol. The transmission data storing unit 334 temporarily stores the packet received from the transmission processing unit 333. The transmission data storing unit 334 reads out the stored packet based on a readout instruction received from the transmission processing unit 333, and transmits the packet to the port 323.

The counter 335 detects beginning of image capturing in the associated camera 112, i.e., beginning of a frame, based on a vertical synchronization signal received from the associated camera 112, and resets counting at the time of beginning of the frame to perform counting of a clock signal. Then, the counter 335 outputs its count value to the transmission processing unit 333. When the count value reaches a previously set first setting value, the transmission processing unit 333 at that time instructs the transmission data storing unit 334 to start reading out a packet generated from image data captured by the associated camera 112 and stored in the transmission data storing unit 334. Thus, in the camera adapter 120, when the count value obtained by starting counting based on the vertical synchronization signal has reached the first setting value, transmission of a packet generated from image data captured by the associated camera 112 is started. Moreover, when the count value reaches a previously set second setting value, the transmission processing unit 333 discards a packet generated from image data captured by the associated camera 112 and stored in the transmission data storing unit 334. Furthermore, the second setting value is a value larger than the first setting value.

FIG. 4 is a diagram illustrating an example of the format of a header which is appended to a packet to be transmitted in the image acquisition apparatus 100 according to the first exemplary embodiment. In the first exemplary embodiment, as the format of a header, the header format of the Internet Protocol is illustrated as an example. Furthermore, since the header format of the Internet Protocol illustrated in FIG. 4 is already known, only fields relevant to the first exemplary embodiment are described and the detailed description of the other fields is omitted.

In the image acquisition apparatus 100 according to the first exemplary embodiment, the transmission and reception processing unit 330 of the camera adapter 120 generates a packet obtained by fragmenting image data captured by the associated camera 112 and appends the header illustrated in FIG. 4 to the generated packet. In the case of the header format of the Internet Protocol illustrated in FIG. 4, a "Flags" field is set as a reserve region. In the first exemplary embodiment, the value of bit 16 of the "Flags" field is used as a flag indicating whether the packet concerned in the cascade connection of the image acquisition apparatus 100 is a sequential transmission packet generated by the sequential transmission camera adapter.

In the case of the first exemplary embodiment, the value of bit 16 of the "Flags" field is set as a sequential transmission enablement flag. Thus, a packet to which a header with the sequential transmission enablement flag set to "1" has been appended is treated as a sequential transmission packet. In the case of the first exemplary embodiment, the sequential transmission camera adapter generates a sequential transmission packet by setting "1" to the sequential transmission enablement flag of the header of a packet generated from image data captured by the associated camera. As mentioned above, the sequential transmission packets are sequentially transmitted one by one in the order of being farther from the server 130 (i.e., the server 130 via the switching hub 150 on the network) in the cascade-connected camera adapters 120.

Moreover, in the case of the first exemplary embodiment, a packet to which a header with the sequential transmission enablement flag set to "0" has been appended is treated as a simultaneous transmission packet. In the first exemplary embodiment, the simultaneous transmission camera adapter generates a simultaneous transmission packet by setting "0" to the sequential transmission enablement flag of the header of a packet generated from image data captured by the associated camera, and immediately starts transmission of the simultaneous transmission packet. Thus, the simultaneous transmission camera adapter immediately starts transmission of a simultaneous transmission packet generated from image data captured by the associated camera, without depending on transmission of packets in the other camera adapters. Moreover, upon receipt of the simultaneous transmission packet, each cascade-connected camera adapter 120 immediately transmits the received simultaneous transmission packet.

Moreover, in the image acquisition apparatus 100 according to the first exemplary embodiment, an initial value which is in common between all of the cascade-connected camera adapters 120 is set to a "Time to Live" field of the header format illustrated in FIG. 4. The value of the "Time to Live" field is decremented by "1" each time a packet having this header passes through the sequential transmission camera adapter. On the other hand, in a case where the camera adapter 120 is a simultaneous transmission camera adapter, the value of the "Time to Live" field of the sequential transmission packet is not changed. Additionally, in the image acquisition apparatus 100 according to the first exemplary embodiment, in a case where the value of the "Time to Live" field of the header is "0", the camera adapter 120 does not transfer a packet having this header to a downstream camera adapter. Therefore, in a case where the sequential transmission enablement flag of a packet to be transferred is "1" and the value of the "Time to Live" field is "the initial value −1", the camera adapter 120 is able to recognize that the packet to be transmitted is a packet generated from captured image data by a sequential transmission camera adapter situated upstream by one.

Moreover, in the first exemplary embodiment, the value of bit 18 of the "Flags" field of the header format illustrated in FIG. 4 is used as a flag for determining timing at which to start transmission of a sequential transmission packet generated by the sequential transmission camera adapter from image data captured by the associated camera. Thus, the sequential transmission camera adapter determines timing at which to start transmission of a sequential transmission packet generated from image data captured by the associated camera, based on the value of bit 18 of the "Flags" field included in the header of a packet received from an upstream adjacent camera adapter.

In the case of the first exemplary embodiment, the value of bit 18 of the "Flags" field is used as a last fragment flag. Thus, the last fragment flag being "0" indicates that there exists a subsequent fragmented packet, and the last fragment flag being "1" indicates that there does not exist a subsequent fragmented packet. Accordingly, the camera adapter 120 is able to determine whether there exists a subsequent fragmented packet, by referring to the last fragment flag. In the case of the first exemplary embodiment, when the last fragment flag is "1" and there does not exist a subsequent fragmented packet, the sequential transmission camera adapter starts transmission of a sequential transmission packet generated from image data captured by the associated camera.

Figure 5:
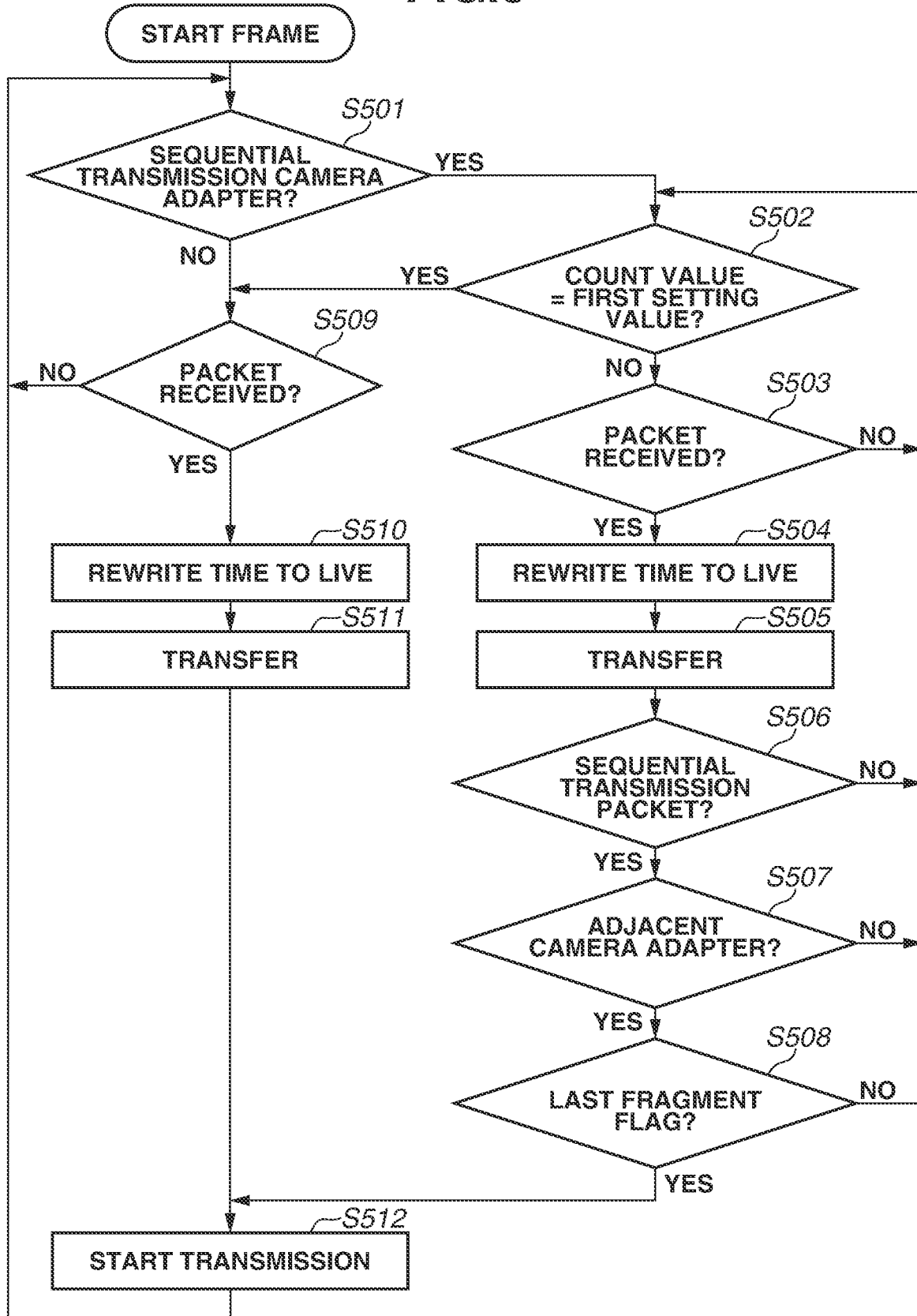
FIG. 5 is a flowchart illustrating a transmission algorithm according to one or more aspects of the present disclosure.

FIG. 5 is a flowchart illustrating a transmission algorithm in the transmission and reception processing unit 330 of the camera adapter 120.

The transmission and reception processing unit 330 is monitoring a vertical synchronization signal output from the associated camera 112, and, when the transmission and reception processing unit 330 detects starting of acquisition of a frame by image capturing performed by the associated camera 112, the counter 335 starts counting of a clock signal, so that the transmission and reception processing unit 330 advances the processing to step S501.

In step S501, the transmission and reception processing unit 330 determines whether the camera adapter 120 concerned is currently set as a sequential transmission camera adapter. If it is determined that the camera adapter 120 concerned is currently set as a sequential transmission camera adapter (YES in step S501), the transmission and reception processing unit 330 advances the processing to step S502. On the other hand, if it is determined that the camera adapter 120 concerned is not currently set as a sequential transmission camera adapter, i.e., the camera adapter 120 concerned is currently set as a simultaneous transmission camera adapter, (NO in step S501), the transmission and reception processing unit 330 advances the processing to step S509.

In step S502, the transmission and reception processing unit 330 checks whether the count value of the counter 335 has reached the previously set first setting value. Then, if it is determined that the count value has reached the first setting value (YES in step S502), the transmission and reception processing unit 330 advances the processing to step S509, and, on the other hand, if it is determined that the count value has not reached the first setting value (NO in step S502), the transmission and reception processing unit 330 advances the processing to step S503.

In step S503, the transmission and reception processing unit 330 determines whether the port 322 has received a packet transmitted from an upstream adjacent camera adapter. If it is determined that the port 322 has not received the packet (NO in step S503), the transmission and reception processing unit 330 returns the processing to step S502, and, on the other hand, if it is determined that the port 322 has received the packet (YES in step S503), the transmission and reception processing unit 330 advances the processing to step S504.

In step S504, the reception processing unit 332 of the transmission and reception processing unit 330 transfers, to the transmission processing unit 333, a packet received by the port 322 and temporarily stored in the reception data storing unit 331. Then, the transmission processing unit 333 performs rewriting processing for decrementing the value of the "Time to Live" field of the header of the packet received from the reception processing unit 332 by "1".

In step S505, the transmission and reception processing unit 330 temporarily stores, in the transmission data storing unit 334, the packet processed by the transmission processing unit 333 in step S504, and then sends the packet to the port 323. With this processing, the packet is transferred to a downstream adjacent camera adapter via the port 323.

Next, in step S506, the transmission and reception processing unit 330 determines whether the packet transferred in step S505 is a sequential transmission packet, by referring to the sequential transmission enablement flag of the header of the transferred packet. If the sequential transmission enablement flag is "1", the transmission and reception processing unit 330 determines that the transferred packet is a sequential transmission packet (YES in step S506), and then advances the processing to step S507. On the other hand, if the sequential transmission enablement flag is "0", the transmission and reception processing unit 330 determines that the transferred packet is a simultaneous transmission packet (NO in step S506), and then returns the processing to step S502.

In step S507, the transmission and reception processing unit 330 determines, based on the value of the "Time to Live" field of the header of the packet transferred in step S505, whether the transferred packet is a packet which an upstream adjacent sequential transmission camera adapter has generated from image data captured by the associated camera. If the value of the "Time to Live" field is "the initial value −1", the transmission and reception processing unit 330 determines that the transferred packet is a packet which an upstream adjacent sequential transmission camera adapter has generated from captured image data (YES in step S507), and then advances the processing to step S508, and, if it is not so (NO in step S507), the transmission and reception processing unit 330 returns the processing to step S502.

In step S508, the transmission and reception processing unit 330 determines, based on the last fragment flag of the packet transferred in step S505, the transferred packet is the last fragment in the captured image data. If it is determined that the transferred packet is the last fragment (YES in step S508), the transmission and reception processing unit 330 advances the processing to step S512, and, if it is not so (NO in step S508), the transmission and reception processing unit 330 returns the processing to step S502.

Moreover, in step S509, to which the processing has been advanced from step S501 or step S502, the transmission and reception processing unit 330 determines whether the port 322 has received a packet transmitted from an upstream adjacent camera adapter. If it is determined that the port 322 has not received the packet (NO in step S509), the transmission and reception processing unit 330 returns the processing to step S501, and, if it is determined that the port 322 has received the packet (YES in step S509), the transmission and reception processing unit 330 advances the processing to step S510.

In step S510, the reception processing unit 332 of the transmission and reception processing unit 330 transfers, to the transmission processing unit 333, a packet received by the port 322 and temporarily stored in the reception data storing unit 331. Then, if the packet is a simultaneous transmission packet, the transmission processing unit 333 performs rewriting processing for decrementing the value of the "Time to Live" field of the header by "1".

Next, in step S511, the transmission and reception processing unit 330 temporarily stores, in the transmission data storing unit 334, the packet processed by the transmission processing unit 333 in step S510, and then transfers the packet to a downstream adjacent camera adapter via the port 323. Then, after step S511, the transmission and reception processing unit 330 advances the processing to step S512.

In step S512, since a condition for the camera adapter 120 to start transmission of image data captured by the associated camera 112 has been satisfied, the transmission and reception processing unit 330 starts transmission of the captured image data. Furthermore, transmission of a packet of the image data captured by the associated camera 112 continues until a frame of the captured image data ends. Then, after performing processing in step S512, the transmission and reception processing unit 330 returns the processing to step S501.

As described above, in the transmission algorithm according to the first exemplary embodiment, a transmission operation differs depending on a combination of whether the camera adapter 120 is a sequential transmission camera adapter or a simultaneous transmission camera adapter and whether the received packet is a sequential transmission packet or a simultaneous transmission packet. In the following description, differences in transmission operation caused by such a combination are described.

First, a transmission operation in a case where the camera adapter 120 is a simultaneous transmission camera adapter is described. The transmission operation of the simultaneous transmission camera adapter differs as follows between a case where a sequential transmission packet, in which the sequential transmission enablement flag is "1", has been received and a case where a simultaneous transmission packet, in which the sequential transmission enablement flag is "0", has been received.

In the simultaneous transmission camera adapter, in a case where a sequential transmission packet, in which the sequential transmission enablement flag is "1", has been received, the reception processing unit 332 confirms that the value of the "Time to Live" field of the header of the received packet is not "0". Then, when having confirmed that the value of the "Time to Live" field is not "0", the reception processing unit 332 transfers the packet from the reception data storing unit 331 to the transmission processing unit 333. The transmission processing unit 333 recognizes that the packet transferred from the reception processing unit 332 is a sequential transmission packet, by detecting that the sequential transmission enablement flag of the header of the transferred packet is "1". Without changing the value of the "Time to Live" field of the header of the sequential transmission packet transferred from the reception processing unit 332, the transmission processing unit 333 sends the sequential transmission packet to the transmission data storing unit 334 and causes the transmission data storing unit 334 to temporarily store the sequential transmission packet. Then, the transmission and reception processing unit 330 transmits, to a downstream adjacent camera adapter via the port 323, a sequential transmission packet read out from the transmission data storing unit 334. Moreover, at this time, regardless of the last fragment flag, when having generated a simultaneous transmission packet from image data captured by the associated camera 112, the camera adapter 120 immediately transmits the generated simultaneous transmission packet.

In the simultaneous transmission camera adapter, in a case where a simultaneous transmission packet, in which the sequential transmission enablement flag is "0", has been received, the reception processing unit 332 confirms that the value of the "Time to Live" field of the header of the received packet is not "0", and then transfers the packet to the transmission processing unit 333. The transmission processing unit 333 recognizes that the packet transferred from the reception processing unit 332 is a simultaneous transmission packet, by detecting that the sequential transmission enablement flag of the header of the transferred packet is "0". The transmission processing unit 333 at this time decrements the value of the "Time to Live" field of the header by "1", and then temporarily stores the simultaneous transmission packet in the transmission data storing unit 334. Then, the transmission and reception processing unit 330 transmits, to a downstream adjacent camera adapter via the port 323, a simultaneous transmission packet read out from the transmission data storing unit 334. Moreover, at this time, regardless of the last fragment flag, when having generated a simultaneous transmission packet from image data captured by the associated camera 112, the camera adapter 120 immediately transmits the generated simultaneous transmission packet.

Next, a transmission operation in a case where the camera adapter 120 is a sequential transmission camera adapter is described. The transmission operation of the sequential transmission camera adapter differs as follows between a case where a sequential transmission packet, in which the sequential transmission enablement flag is "1", has been received and a case where a simultaneous transmission packet, in which the sequential transmission enablement flag is "0", has been received.

In the sequential transmission camera adapter, in a case where a sequential transmission packet, in which the sequential transmission enablement flag is "1", has been received, the reception processing unit 332 confirms that the value of the "Time to Live" field of the header of the received packet is not "0", and then transfers the packet to the transmission processing unit 333. The transmission processing unit 333 recognizes that the packet transferred from the reception processing unit 332 is a sequential transmission packet, by detecting that the sequential transmission enablement flag of the header of the transferred packet is "1". The transmission processing unit 333 at this time decrements the value of the "Time to Live" field of the header by "1", and then temporarily stores the sequential transmission packet in the transmission data storing unit 334. Then, the transmission and reception processing unit 330 transmits, to a downstream adjacent camera adapter via the port 323, a sequential transmission packet read out from the transmission data storing unit 334. At this time, in a case where the last fragment flag is "1", the camera adapter 120 starts transmission of a packet generated from image data captured by the camera 112.

In the sequential transmission camera adapter, in a case where a simultaneous transmission packet, in which the sequential transmission enablement flag is "0", has been received, the reception processing unit 332 confirms that the value of the "Time to Live" field of the header of the received packet is not "0", and then transfers the packet to the transmission processing unit 333. The transmission processing unit 333 recognizes that the packet transferred from the reception processing unit 332 is a simultaneous transmission packet, by detecting that the sequential transmission enablement flag of the header of the transferred packet is "0". The transmission processing unit 333 at this time decrements the value of the "Time to Live" field of the header by "1", and then temporarily stores the simultaneous transmission packet in the transmission data storing unit 334. Then, the transmission and reception processing unit 330 transmits, to a downstream adjacent camera adapter via the port 323, a simultaneous transmission packet read out from the transmission data storing unit 334. At this time, regardless of the last fragment flag, the camera adapter 120 does not start transmission of a packet generated from image data captured by the camera 112.

Figure 6:
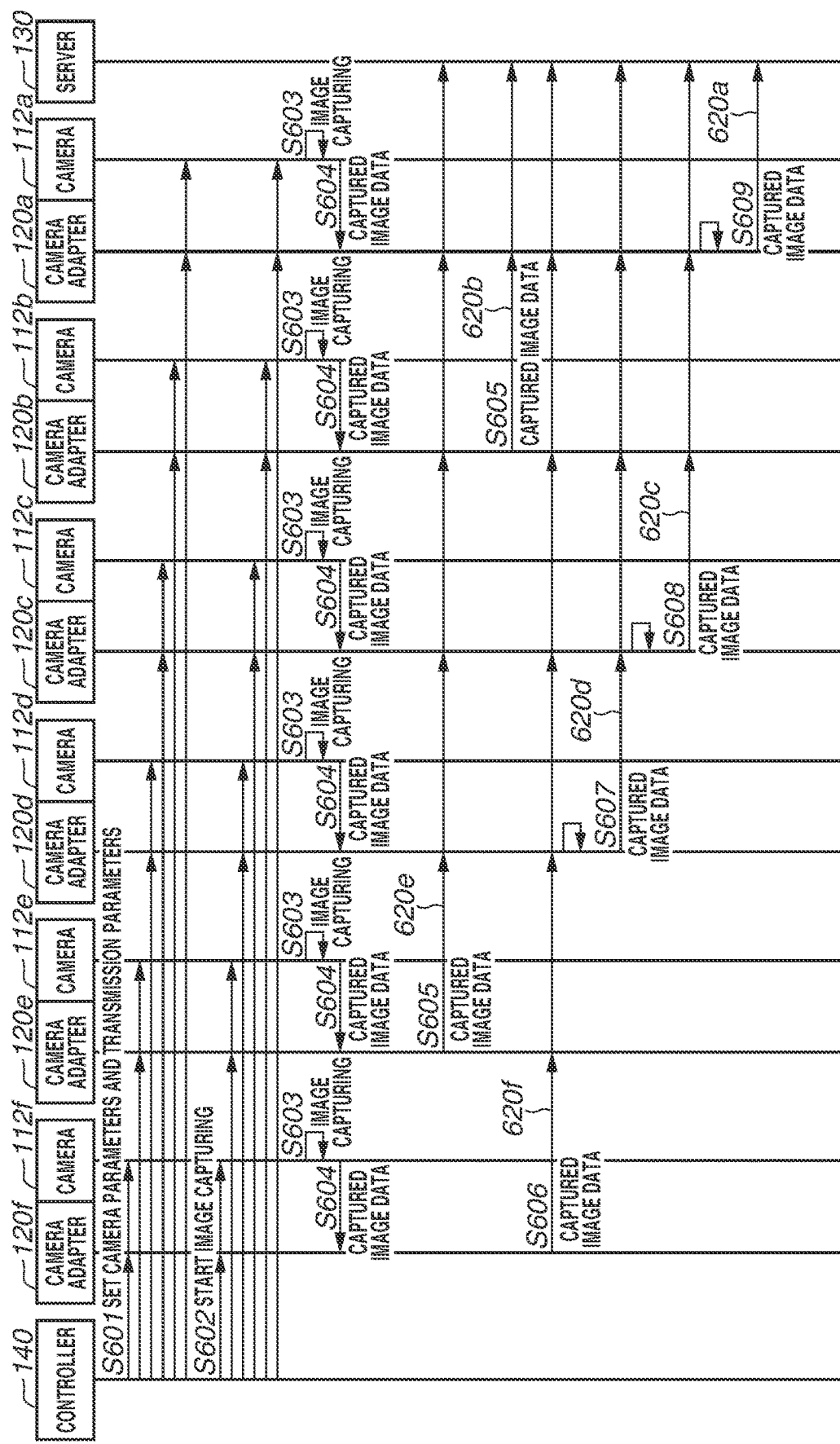
FIG. 6 is an operation sequence diagram of the image acquisition apparatus according to one or more aspects of the present disclosure.

Next, a transmission operation sequence of the camera adapter 120 in the image acquisition apparatus 100 according to the first exemplary embodiment is described with reference to FIG. 6. The transmission operation sequence illustrated by example in FIG. 6 represents an example in which the camera adapters 120*e* and 120*b* are simultaneous transmission camera adapters and the other camera adapters 120*f*, 120*d*, 120*c*, and 120*a* are sequential transmission camera adapters. Thus, FIG. 6 illustrates an example in which sequential transmission camera adapters and simultaneous transmission camera adapters exist in a mixed manner in a transmission path from the camera adapters 120 to the server 130 and a sequential transmission packet and a simultaneous transmission packet are transmitted in a superimposed manner.

First, in step S601, the controller 140 sets transmission parameters related to transmission and reception to the respective camera adapters 120. Moreover, the controller 140 sets, via the respective camera adapters 120, camera parameters for determining image capturing conditions of the respective associated cameras 112. In the case of the example illustrated in FIG. 6, the controller 140 sets transmission parameters for setting the camera adapters 120*e* and 120*b* as simultaneous transmission camera adapters and sets transmission parameters for setting the other camera adapters 120 as sequential transmission camera adapters. Thus, the controller 140 sets, to the camera adapters 120*e* and 120*b*, transmission parameters for generating a simultaneous transmission packet in which the header with the sequential transmission enablement flag set to "0" has been appended to image data captured by each of the respective associated cameras 112*e* and 112*b*. Moreover, the controller 140 sets, to the other camera adapters 120, transmission parameters for generating a sequential transmission packet in which the header with the sequential transmission enablement flag set to "1" has been appended to image data captured by each of the respective associated cameras 112. Moreover, the controller 140 performs clock time synchronization of the camera adapters 120 and the associated cameras 112.

Next, in step S602, the controller 140 transmits control signals for starting synchronous image capturing to the respective associated cameras 112 via the respective camera adapters 120. In response to the control signals, in step S603, the respective associated cameras 112 perform image capturing for every one frame period in synchronization with each other, and, moreover, in step S604, synchronously output captured image data for every one frame to the respective camera adapters 120 correspondingly connected thereto.

Here, in step S605, when a packet generated from image data captured by each of the associated cameras 112*e* and 112*b* is input to the transmission processing unit 333, the camera adapters 120*e* and 120*b*, which are simultaneous transmission camera adapters, immediately start transmission of the respective packets. Thus, the camera adapters 120*e* and 120*b* immediately transmit, to the respective downstream camera adapters 120, simultaneous transmission packets 620*e* and 620*b* in which the header with the sequential transmission enablement flag set to "0" has been appended to image data captured by the respective associated cameras 112*e* and 112*b*. For example, the simultaneous transmission packet 620*e* sequentially passes through the downstream camera adapters 120*d*, 120*c*, 120*b*, and 120*a* and is then transmitted to the server 130 via the switching hub 150. Moreover, for example, the simultaneous transmission packet 620*b* passes through the downstream camera adapter 120*a* and is then transmitted to the server 130 via the switching hub 150. Moreover, the respective camera adapters 120, which transmit the simultaneous transmission packets 620*e* and 620*b*, decrement the value of the "Time to Live" field thereof by "1". However, regardless of the value of the last fragment flag, the camera adapters 120*d*, 120*c*, and 120*a*, which are sequential transmission camera adapters, do not start transmission of sequential transmission packets generated from image data captured by the respective associated cameras 112.

Next, in step S606, when the count value of the counter 335 has reached the first setting value, the camera adapter 120*f*, which is a sequential transmission camera adapter, transmits, to the adjacent camera adapter 120*e*, a sequential transmission packet 620*f* generated from image data captured by the camera 112*f*. Thus, when the count value has reached the first setting value, the camera adapter 120*f* transmits, to the downstream camera adapter 120*e*, the sequential transmission packet 620*f*, in which the header with the sequential transmission enablement flag set to "1" has been appended to image data captured by the camera 112*f*. Furthermore, the camera adapter 120*f* is situated at a position farthest from the server 130 out of the cascade-connected camera adapters 120 and, therefore, does not receive a packet transmitted from any other camera adapter 120. Therefore, the camera adapter 120*f* starts transmission of the sequential transmission packet 620*f* at timing when the count value has reached the first setting value.

The camera adapter 120*e*, which receives the sequential transmission packet 620*f* transmitted from the camera adapter 120*f*, is a simultaneous transmission camera adapter and, therefore, transfers, to the downstream camera adapter 120*d*, the sequential transmission packet 620*f* without changing the value of the "Time to Live" field thereof. Furthermore, the camera adapter 120*e* is a simultaneous transmission camera adapter and, therefore, immediately after a packet generated from image data captured by the camera 112*e* is input to the transmission processing unit 333, the camera adapter 120*e* starts transmission of the simultaneous transmission packet 620*e*. Thus, the camera adapter 120*e* performs transmission of the sequential transmission packet 620*f* received from the camera adapter 120*f*, in parallel with the simultaneous transmission packet 620*e*.

The camera adapter 120*d* is a sequential transmission camera adapter and, therefore, decrements the value of the "Time to Live" field of the received sequential transmission packet 620*f* by "1" and then transmits the sequential transmission packet 620*f* to the camera adapter 120*c*. Moreover, when receiving a packet in which the last fragment flag is "1", the camera adapter 120*d* advances the processing to step S607 to start transmission of a sequential transmission packet 620*d* generated from image data captured by the camera 112*d*.

The camera adapter 120*c* is a sequential transmission camera adapter and, therefore, when receiving the sequential transmission packet 620*f*, performs processing similar to that performed by the camera adapter 120*d* and then transfers the sequential transmission packet 620*f* to the downstream camera adapter 120*b*.

The camera adapter 120*b* is a simultaneous transmission camera adapter and, therefore, when receiving the sequential transmission packet 620*f*, transfers, to the downstream camera adapter 120*a*, the sequential transmission packet 620*f* without changing the value of the "Time to Live" field thereof. Furthermore, the camera adapter 120*b*, which is a simultaneous transmission camera adapter, starts transmission of the simultaneous transmission packet 620*b* immediately after a packet generated from image data captured by the camera 112*b* is input to the transmission processing unit 333. Thus, the camera adapter 120*b* performs transmission of the sequential transmission packet 620*f* in parallel with the simultaneous transmission packet 620*b*.

The camera adapter 120*a* is a sequential transmission camera adapter and, therefore, when receiving the sequential transmission packet 620*f*, decrements the value of the "Time to Live" field thereof by "1" and then outputs the sequential transmission packet 620*f*. Since the camera adapter 120*a* is connected to the switching hub 150, the sequential transmission packet 620*f* is transmitted to the server 130.

Next, in step S607, the camera adapter 120*d* transmits, to the adjacent camera adapter 120*c*, the sequential transmission packet 620*d* generated from image data captured by the camera 112*d*.

The camera adapter 120*c* is a sequential transmission camera adapter and, therefore, when receiving the sequential transmission packet 620*d* from the camera adapter 120*d*, decrements the value of the "Time to Live" field thereof by "1" and then transmits the sequential transmission packet 620*d* to the downstream camera adapter 120*b*. Moreover, when receiving a packet in which the last fragment flag is "1", the camera adapter 120*c* advances the processing to step S608 to start transmission of a sequential transmission packet 620*c* generated from image data captured by the camera 112*c*.

When receiving the sequential transmission packet 620*d*, the camera adapter 120*b*, which is a simultaneous transmission camera adapter, transfers, to the downstream camera adapter 120*a*, the sequential transmission packet 620*d* without changing the value of the "Time to Live" field thereof. Moreover, the camera adapter 120*b* is a simultaneous transmission camera adapter and, therefore, immediately after a packet generated from image data captured by the camera 112*b* is input to the transmission processing unit 333, the camera adapter 120*b* starts transmission of the simultaneous transmission packet 620*b*. Thus, the camera adapter 120*b* performs transmission of the sequential transmission packet 620*d* received from the camera adapter 120*c*, in parallel with the simultaneous transmission packet 620*b*.

When receiving the sequential transmission packet 620*d*, the camera adapter 120*a*, which is a sequential transmission camera adapter, decrements the value of the "Time to Live" field thereof by "1" and then transmits the sequential transmission packet 620*d* to the server 130 via the switching hub 150. Moreover, when receiving a packet in which the last fragment flag is "1", the camera adapter 120*a* advances the processing to step S609 to start transmission of a sequential transmission packet 620*a* generated from image data captured by the camera 112*a*.

Next, in step S608, the camera adapter 120*c* transmits, to the downstream camera adapter 120*b*, a sequential transmission packet 620*c* generated from image data captured by the camera 112*c*.

When receiving the sequential transmission packet 620*c*, the camera adapter 120*b*, which is a simultaneous transmission camera adapter, transfers, to the downstream camera adapter 120*a*, the sequential transmission packet 620*c* without changing the value of the "Time to Live" field thereof. Furthermore, immediately after a packet generated from image data captured by the camera 112*b* is input to the transmission processing unit 333, the camera adapter 120*b* starts transmission of the simultaneous transmission packet 620*b*. Accordingly, the camera adapter 120*b* performs transmission of the sequential transmission packet 620*c* in parallel with the simultaneous transmission packet 620*b*.

The camera adapter 120*a*, which is a sequential transmission camera adapter, decrements the value of the "Time to Live" field of the received sequential transmission packet 620*c* by "1" and then transmits the sequential transmission packet 620*c* to the server 130 via the switching hub 150. Moreover, in step S609, the camera adapter 120*a* transmits the sequential transmission packet 620*a* generated from image data captured by the camera 112*a* to the server 130 via the switching hub 150.

As described above, in the first exemplary embodiment, a plurality of camera adapters 120 is cascade-connected, and transmits packets generated from image data captured by the respective associated cameras 112 to downstream camera adapters to transmit the packets to the server 130. The plurality of camera adapters 120 is set as simultaneous transmission camera adapters or sequential transmission camera adapters. When image capturing is performed by the associated camera, the simultaneous transmission camera adapter immediately starts transmission of a simultaneous transmission packet generated from the captured image data. Moreover, when having received a sequential transmission packet in which the value of the "Time to Live" field is not "0", the simultaneous transmission camera adapter transmits the sequential transmission packet without changing the value of the "Time to Live" field thereof to a downstream camera adapter. Moreover, when having received a simultaneous transmission packet in which the value of the "Time to Live" field is not "0", the simultaneous transmission camera adapter decrements the value of the "Time to Live" field thereof by "1" and then transmits the simultaneous transmission packet to a downstream camera adapter. On the other hand, when having received a sequential transmission packet in which the value of the "Time to Live" field is not "0", the sequential transmission camera adapter decrements the value of the "Time to Live" field thereof by "1" and then transmits the sequential transmission packet to a downstream camera adapter. Moreover, when having received a simultaneous transmission packet in which the value of the "Time to Live" field is not "0", the sequential transmission camera adapter decrements the value of the "Time to Live" field thereof by "1" and then transmits the simultaneous transmission packet to a downstream camera adapter. Then, when having received a sequential transmission packet transmitted from an upstream sequential transmission camera adapter, the sequential transmission camera adapter transmits the sequential transmission packet in the order of being farther from the server.

In the first exemplary embodiment, controlling transmission operations of the respective camera adapters based on the sequential transmission enablement flag, the last fragment flag, and the value of the "Time to Live" field enables independently transmitting a sequential transmission packet and a simultaneous transmission packet on a network having a cascade connection configuration. Therefore, in a case where the first exemplary embodiment is applied to a virtual viewpoint image generation system, it becomes possible to efficiently transmit both data desired to be transmitted at a high frame frequency such as data about a foreground region and data having a relatively few variation of the required bandwidth and able to be transmitted at a low frame frequency such as data about a background region.

In a second exemplary embodiment, a transmission operation in a case where a frame frequency used for transmitting captured image data differs between a sequential transmission camera adapter and a simultaneous transmission camera adapter is described.

Figure 7A:
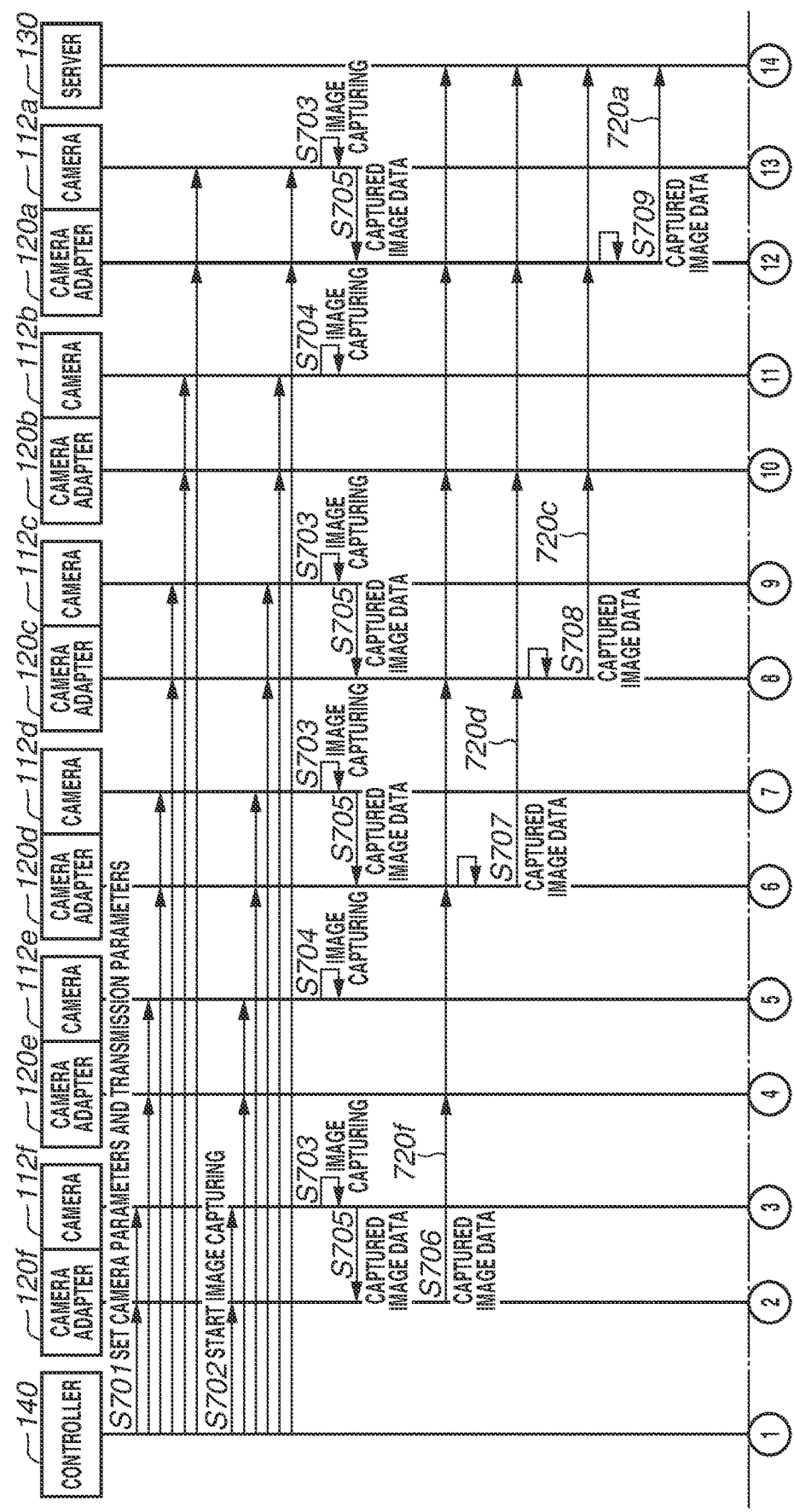

FIGS. 7A and 7B are diagrams illustrating a transmission operation sequence of the image acquisition apparatus 100 according to the second exemplary embodiment. Furthermore, the camera adapters 120e and 120b are simultaneous transmission camera adapters, the other camera adapters 120f, 120d, 120c, and 120a are sequential transmission camera adapters, and the camera adapter 120f is an adapter farthest from the server 130.

In the transmission operation sequence illustrated in FIGS. 7A and 7B, step S701 and step S702 are the same as step S601 and step S602 in the first exemplary embodiment and, therefore, the description thereof is omitted. In the second exemplary embodiment, the respective associated cameras 112f, 112d, 112c, and 112a of the camera adapters 120f, 120d, 120c, and 120a, which are sequential transmission camera adapters, perform image capturing for every one frame period in synchronization with each other. On the other hand, in the case of the second exemplary embodiment, the respective associated cameras 112e and 112b of the camera adapters 120e and 120b, which are simultaneous transmission camera adapters, perform image capturing for every two frame periods in synchronization with each other.

In step S703, the respective associated cameras 112f, 112d, 112c, and 112a of the camera adapters 120f, 120d, 120c, and 120a, which are sequential transmission camera adapters, perform image capturing for every one frame period in synchronization with each other. Then, in step S705, the cameras 112f, 112d, 112c, and 112a output image data for one frame to the respective associated camera adapters 120f, 120d, 120c, and 120a. Moreover, in step S704, the respective associated cameras 112e and 112b of the camera adapters 120e and 120b, which are simultaneous transmission camera adapters, perform image capturing for every two frame periods in synchronization with each other.

In step S706, when the count value of the counter 335 has reached the first setting value, the camera adapter 120f, which is a sequential transmission camera adapter, transmits, to the downstream camera adapter 120e, a sequential transmission packet 720f generated from image data captured by the camera 112f.

Moreover, when receiving the sequential transmission packet 720f, the camera adapter 120e, which is a simultaneous transmission camera adapter, transfers, to the downstream camera adapter 120d, the sequential transmission packet 720f without changing the value of the "Time to Live" field thereof. Furthermore, since, at this time, the camera 112e is performing image capturing for two frame periods, at this timing, image data captured by the camera 112e is not yet input to the camera adapter 120e. Accordingly, the camera adapter 120e has not yet performed transmission of a simultaneous transmission packet 720e which is generated from image data captured by the camera 112e.

When receiving the sequential transmission packet 720f, the camera adapter 120d, which is a sequential transmission camera adapter, decrements the value of the "Time to Live" field thereof by "1" and then transmits the sequential transmission packet 720f to the downstream camera adapter 120c. Moreover, when receiving a packet in which the last fragment flag is "1", the camera adapter 120d advances the processing to step S707 and then starts transmission of a sequential transmission packet 720d generated from image data captured by the camera 112d.

When receiving the sequential transmission packet 720f, the camera adapter 120c, which is a sequential transmission camera adapter, performs processing similar to that performed by the camera adapter 120d and then transmits the sequential transmission packet 720f to the downstream camera adapter 120b.

When receiving the sequential transmission packet 720f, the camera adapter 120b, which is a simultaneous transmission camera adapter, transfers, to the downstream camera adapter 120a, the sequential transmission packet 720f without changing the value of the "Time to Live" field thereof. Furthermore, since the camera 112b is performing image capturing for two frame periods, at this timing, image data captured by the camera 112b is not yet input to the camera adapter 120b. Accordingly, the camera adapter 120b has not yet performed transmission of a simultaneous transmission packet 720*b* which is generated from image data captured by the camera 112*b*.

When receiving the sequential transmission packet 720*f*, the camera adapter 120*a*, which is a sequential transmission camera adapter, decrements the value of the "Time to Live" field thereof by "1" and then transmits the sequential transmission packet 720*f* to the switching hub 150. With this transmission, the sequential transmission packet 720*f* is transmitted to the server 130 via the switching hub 150.

Moreover, in step S707, the camera adapter 120*d*, which is a sequential transmission camera adapter, transmits, to the downstream camera adapter 120*c*, the sequential transmission packet 720*d* generated from image data captured by the camera 112*d*.

When receiving the sequential transmission packet 720*d*, at this time, the camera adapter 120*c*, which is a sequential transmission camera adapter, decrements the value of the "Time to Live" field thereof by "1" and then transmits the sequential transmission packet 720*d* to the downstream camera adapter 120*b*. Moreover, when receiving a packet in which the last fragment flag is "1", the camera adapter 120*c* advances the processing to step S708 and then starts transmission of a sequential transmission packet 720*c* generated from image data captured by the camera 112*c*.

When receiving the sequential transmission packet 720*d*, the camera adapter 120*b*, which is a simultaneous transmission camera adapter, transfers, to the downstream camera adapter 120*a*, the sequential transmission packet 720*d* without changing the value of the "Time to Live" field thereof. Furthermore, since the camera 112*b* is performing image capturing for two frame periods, at this timing, image data captured by the camera 112*b* is not yet input to the camera adapter 120*b*. Accordingly, the camera adapter 120*b* has not yet performed transmission of a simultaneous transmission packet 720*b* which is generated from image data captured by the camera 112*b*.

When receiving the sequential transmission packet 720*d*, the camera adapter 120*a*, which is a sequential transmission camera adapter, decrements the value of the "Time to Live" field thereof by "1" and then transmits the sequential transmission packet 720*d* to the switching hub 150. With this transmission, the sequential transmission packet 720*d* is transmitted to the server 130 via the switching hub 150.

In step S708, the camera adapter 120*c*, which is a sequential transmission camera adapter, transmits, to the downstream camera adapter 120*b*, the sequential transmission packet 720*c* generated from image data captured by the camera 112*c*.

When receiving the sequential transmission packet 720*c*, the camera adapter 120*b*, which is a simultaneous transmission camera adapter, transfers, to the downstream camera adapter 120*a*, the sequential transmission packet 720*c* without changing the value of the "Time to Live" field thereof. Furthermore, since the camera 112*b* is performing image capturing for two frame periods, at this timing, image data captured by the camera 112*b* is not yet input to the camera adapter 120*b* and, accordingly, the camera adapter 120*b* has not yet performed transmission of the simultaneous transmission packet 720*b*.

When receiving the sequential transmission packet 720*d*, the camera adapter 120*a*, which is a sequential transmission camera adapter, decrements the value of the "Time to Live" field thereof by "1" and then transmits the sequential transmission packet 720*d* to the server 130 via the switching hub 150. Moreover, when receiving a packet in which the last fragment flag is "1", the camera adapter 120*a* advances the processing to step S709 and then starts transmission of a sequential transmission packet 720*a* generated from image data captured by the camera 112*a*.

Moreover, in step S710, the cameras 112*f*, 112*d*, 112*c*, and 112*a* start image capturing and perform image capturing for one frame period. Then, in step S711, the cameras 112*f*, 112*d*, 112*c*, and 112*a* output image data for one frame to the respective associated camera adapters 120*f*, 120*d*, 120*c*, and 120*a*. Moreover, the cameras 112*e* and 112*b* output image data for two frames to the respective associated camera adapters 120*c* and 120*b*.

In step S712, the camera adapters 120*e* and 120*b*, which are simultaneous transmission camera adapters, respectively transmit simultaneous transmission packets 720*e* and 720*b* generated from image data captured by the cameras 112*e* and 112*b*. Then, the simultaneous transmission packet 720*e* output from the camera adapter 120*e* passes through the camera adapters 120*d*, 120*c*, 120*b*, and 120*a* and is then output to the server 130 via the switching hub 150. Moreover, the simultaneous transmission packet 720*b* output from the camera adapter 120*b* passes through the camera adapter 120*a* and is then output to the server 130 via the switching hub 150. Moreover, the respective camera adapters 120 which transmit the simultaneous transmission packet 720*e* and 720*b* decrement the value of the "Time to Live" field thereof by "1". However, regardless of the value of the last fragment flag, the camera adapters 120*d*, 120*c*, and 120*a*, which are sequential transmission camera adapters, do not start transmission of sequential transmission packets generated from image data captured by the respective associated cameras 112.

Transmission operations in step S713, step S714, step S715, and step S716 are similar to those in step S706, step S707, step S708, and step S709 and, therefore, the description thereof is omitted. With these processing operations in step S713, step S714, step S715, and step S716, the sequential transmission packets 720*f*, 720*d*, 720*c*, and 720*a* are transmitted one by one in sequence to the server 130.

As described above, in the second exemplary embodiment, even when a plurality of cameras is performing image capturing at respective different frame frequencies, it is possible to independently perform transmission of a sequential transmission packet and a simultaneous transmission packet via the respective cascade-connected camera adapters 120. Therefore, in a case where the second exemplary embodiment is applied to a virtual viewpoint image generation system, it becomes possible to efficiently transmit both data desired to be transmitted at a high frame frequency such as data about a foreground region and data able to be transmitted even at a low frame frequency such as data about a background region.

Furthermore, while, in the first and second exemplary embodiments, each camera adapter 120 uses the value of the "Time to Live" field of the header to determine that the received packet is a packet transmitted from the upstream sequential transmission camera adapter, the first and second exemplary embodiments are not limited to this example. Another method can be used as long as it is capable of identifying a camera adapter which has transmitted a packet. For example, if an identifier is attached to each camera adapter and identifier information is appended to the header of a packet, it becomes possible to determine a packet generated by which upstream camera adapter the received packet is.

Figure 8:
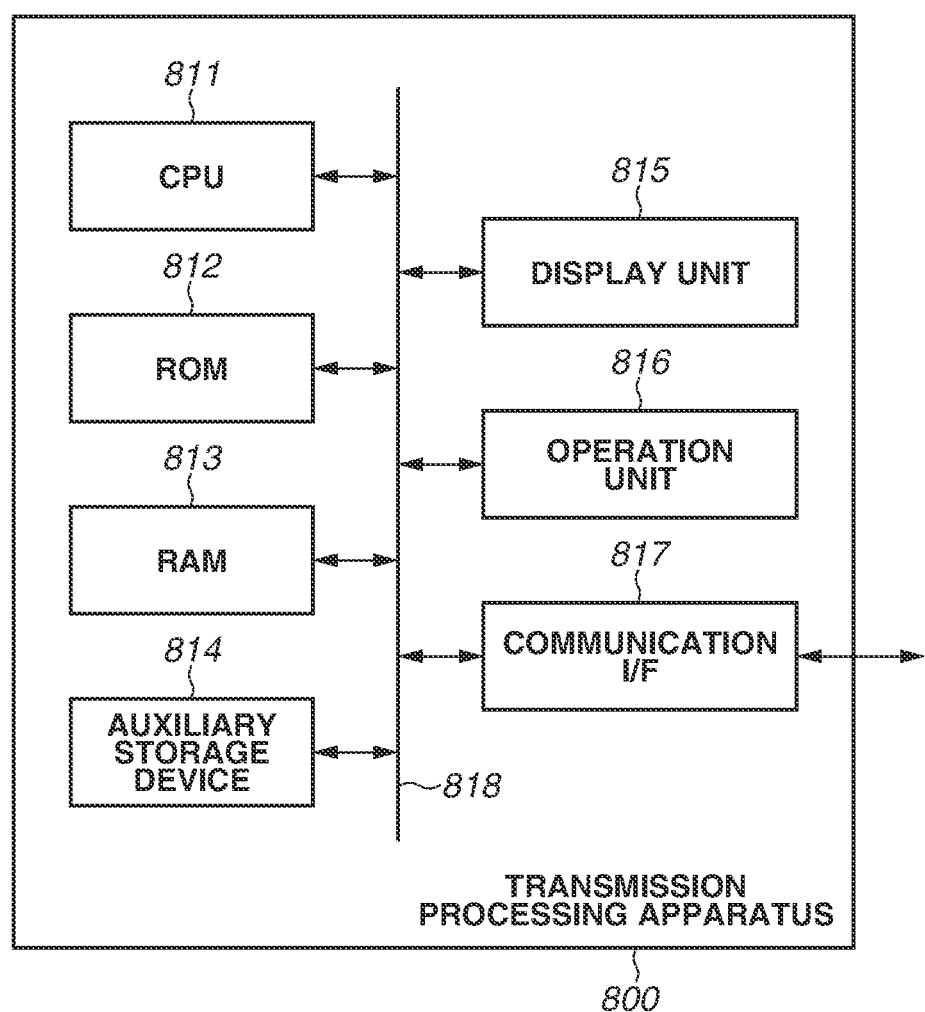
FIG. 8 is a diagram illustrating a hardware configuration example of a transmission processing apparatus.

FIG. 8 is a diagram illustrating a hardware configuration example of a transmission processing apparatus 800, which implements the function of the camera adapter 120 which generates a packet based on image data captured by the associated camera 112 and performs transmission processing of the packet, as described in the above exemplary embodiments.

The transmission processing apparatus 800 includes a central processing unit (CPU) 811, a read-only memory (ROM) 812, a random access memory (RAM) 813, an auxiliary storage device 814, a display unit 815, an operation unit 816, a communication interface (U/F) 817, and a bus 818.

The CPU 811 implements the above-described transmission processing of packets in the camera adapter 120 by controlling the entire transmission processing apparatus 800 using computer programs and data stored in the ROM 812 and the RAM 813. Furthermore, the transmission processing apparatus 800 can include one or a plurality of pieces of hardware different from the CPU 811 and at least a part of processing to be performed by the CPU 811 can be performed by dedicated hardware. Examples of the dedicated hardware include an application specific integrated circuit (ASIC), a field programmable gate array (FPGA), and a digital signal processor (DSP). The ROM 812 stores, for example, programs which are not required to be changed. The RAM 813 temporarily stores, for example, programs and data supplied from the auxiliary storage device 814 and data supplied from an external apparatus via the communication i/F 817. The auxiliary storage device 814 is configured with, for example, a hard disk drive, and stores various pieces of data such as image data and audio data.

The display unit 815 is configured with, for example, a liquid crystal display or a light-emitting diode (LED) display, and displays, for example, a graphical user interface (GUI) used for the user to operate the transmission processing apparatus 800. The operation unit 816 is configured with, for example, a keyboard, a mouse, a joystick, or a touch panel, and inputs various instructions to the CPU 811 upon receiving an operation performed by the user. The CPU 811 operates as a display control unit for controlling the display unit 815 and an operation control unit for controlling the operation unit 816.

The communication I/F 817 is used to perform communication with an external apparatus situated outside the transmission processing apparatus 800. For example, in a case where the transmission processing apparatus 800 is connected to an external apparatus by wire, a cable for communication is connected to the communication I/F 817. In a case where the transmission processing apparatus 800 has the function of performing wireless communication with an external apparatus, the communication I/F 817 is equipped with an antenna. The bus 818 interconnects various units of the transmission processing apparatus 800 and is used to transfer information. Furthermore, in the case of the present hardware configuration example, the external apparatus to be connected to the transmission processing apparatus 800 includes, for example, another camera adapter 120 (another transmission processing apparatus 800) cascade-connected thereto as mentioned above, the switching hub 150, and the associated camera 112.

While, in the present hardware configuration example, the display unit 815 and the operation unit 816 are present within the transmission processing apparatus 800, at least one of the display unit 815 and the operation unit 816 can be present outside the transmission processing apparatus 800 as a separate apparatus. Moreover, the transmission processing apparatus 800 does not necessarily need to include the display unit 815 or the operation unit 816.

Each of the above-described exemplary embodiments is merely an example of embodiment for implementing the present disclosure, and is not intended to be used for interpreting the technical scope of the present disclosure in a limited way. Thus, the present disclosure can be implemented in various forms without departing from its technical idea or its principal features.

According to the above-described exemplary embodiments, it is possible to efficiently transmit image data captured by a plurality of imaging apparatuses.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-096834 filed Jun. 3, 2020, which is hereby incorporated by reference herein in its entirety.

What is claimed is:
1. A transmission processing apparatus comprising:
one or more memories storing instructions; and
one or more processors executing the instructions to:
generate data to be transmitted, based on an image captured by an imaging apparatus;
receive data transmitted from a second transmission processing apparatus which is in cascade connection to the transmission processing apparatus;
transmit the received data; and
determine, depending on a type of the data transmitted from the second transmission processing apparatus, whether to transmit the generated data in an order corresponding to the cascade connection or transmit the generated data in parallel with the data transmitted from the second transmission processing apparatus, wherein timing at which to start transmission of the generated data is determined, based on information about a header appended to the data transmitted from the second transmission processing apparatus, and wherein timing at which to start transmission of the data is determined, based on a value of a "Time to Live" field included in a header of the Internet Protocol and a last fragment flag indicating whether there is a subsequent fragment.

2. The transmission processing apparatus according to claim 1, wherein a flag indicating a type of the generated data is appended to the generated data.

3. The transmission processing apparatus according to claim 2, wherein the flag is information indicating any one of whether to transmit the generated data in an order corresponding to the cascade connection and whether to transmit the generated data in parallel with the data transmitted from the second transmission processing apparatus.

4. The transmission processing apparatus according to claim 1, wherein transmission of the data is stared in a case where the value of the "Time to Live" field is not "0" and the last fragment flag indicates that there is no subsequent fragment.

5. The transmission processing apparatus according to claim 1, wherein the type of the data is determined depending on which of a foreground region in the image captured by the imaging apparatus and a background region in the image captured by the imaging apparatus the data corresponds to.

6. A transmission processing apparatus comprising:
one or more memories storing instructions; and
one or more processors executing the instructions to:
generate data to be transmitted, based on an image captured by an imaging apparatus;
receive data transmitted from a second transmission processing apparatus which is in cascade connection to the transmission processing apparatus;
transmit the received data; and
determine, depending on a type of the data transmitted from the second transmission processing apparatus, whether to transmit the generated data in an order corresponding to the cascade connection or transmit the generated data in parallel with the data transmitted from the second transmission processing apparatus,
wherein the type of the data is determined depending on which of a foreground region in the image captured by the imaging apparatus and a background region in the image captured by the imaging apparatus the data corresponds to,
wherein, in a case where the type of the data is data corresponding to the foreground region, the generated data is determined to be transmitted in an order corresponding to the cascade connection and, in a case where the type of the data is data corresponding to the background region, the generated data is determined to be transmitted in parallel with the data transmitted from the second transmission processing apparatus.

7. A transmission processing method for a transmission processing apparatus, the transmission processing method comprising:
generating data to be transmitted, based on an image captured by an imaging apparatus;
receiving data transmitted from a second transmission processing apparatus which is in cascade connection to the transmission processing apparatus
transmitting the received data; and
determining, depending on a type of the data transmitted from the second transmission processing apparatus, whether to transmit the generated data in an order corresponding to the cascade connection or transmit the generated data in parallel with the data transmitted from the second transmission processing apparatus,
wherein the type of the data is determined depending on which of a foreground region in the image captured by the imaging apparatus and a background region in the image captured by the imaging apparatus the data corresponds to,
further comprising, in a case where the type of the data is data corresponding to the foreground region, determining to transmit the generated data in an order corresponding to the cascade connection and, in a case where the type of the data is data corresponding to the background region, determining to transmit the generated data in parallel with the data transmitted from the second transmission processing apparatus.

8. The transmission processing method according to claim 7, further comprising appending, to the generated data, a flag indicating a type of the generated data.

9. The transmission processing method according to claim 7, further comprising determining, based on information about a header appended to the data transmitted from the second transmission processing apparatus, timing at which to start transmission of the generated data.

10. A non-transitory computer-readable storage medium storing computer-executable instructions that, when executed by a computer, cause the computer to perform a method for a transmission processing apparatus, the method comprising:
generating data to be transmitted, based on an image captured by an imaging apparatus;
receiving data transmitted from a second transmission processing apparatus which is in cascade connection to the transmission processing apparatus
transmitting the received data; and
determining, depending on a type of the data transmitted from the second transmission processing apparatus, whether to transmit the generated data in an order corresponding to the cascade connection or transmit the generated data in parallel with the data transmitted from the second transmission processing apparatus,
wherein the type of the data is determined depending on which of a foreground region in the image captured by the imaging apparatus and a background region in the image captured by the imaging apparatus the data corresponds to,
further comprising, in a case where the type of the data is data corresponding to the foreground region, determining to transmit the generated data in an order corresponding to the cascade connection and, in a case where the type of the data is data corresponding to the background region, determining to transmit the generated data in parallel with the data transmitted from the second transmission processing apparatus.

* * * * *